United States Patent Office 2,976,308
Patented Mar. 21, 1961

2,976,308

PREPARATION OF PHOSPHORODITHIOATE TRIESTERS

William E. Bacon, Painesville, Ohio, assignor to The Lubrizol Corporation, Wickliffe, Ohio, a corporation of Ohio No Drawing. Filed Oct. 13, 1954, Ser. No. 462,097

9 Claims. (Cl. 260—461)

This invention relates to a method for the preparation of certain phosphorus and sulfur-containing triesters. In a more restricted consideration, it pertains to the synthesis of phosphorodithioate triesters.

A particularly convenient method of preparing phosphorodithioate triesters involves the reaction of a phosphorodithioic acid with an olefin. The reaction requires no unusual conditions and generally is susceptible to excellent yields. The reaction is illustrated by the following equation:

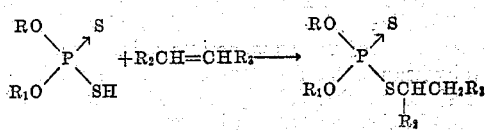

It will be noted that the course of the reaction may proceed in either of two paths, i.e., the phosphorodithioic residue may become attached to the carbon atom which is bound to $R_2$, or alternatively it may add on to the other carbon atom, which is bound to $R_3$. It is likewise apparent that both of these reactions may occur, i.e., that some of the phosphorodithioic residues may add to the one carbon atom and that the rest will add to the other carbon atom. In this latter case, if $R_2$ and $R_3$ are different, then a mixture of products results.

In such situations, i.e., when an unsymmetrical reagent combines with an unsymmetrical olefinic compound, the positive part of the reagent combines with the olefinic carbon atom which bears a relatively negative charge, and this carbon atom is usually identified as the one which has the larger number of hydrogen atoms. This principle was first formulated by Markownikoff and is known as Markownikoff's rule. Reactions of unsymmetrical reagents with unsymmetrical olefinic compounds in which the addition proceeds according to Markownikoff's rule are said to be "normal" whereas such reactions which do not proceed according to Markownikoff's rule are said to be "abnormal," or "non-Markownikoff."

It is a principal object of the present invention to provide a novel process for the preparation of certain phosphorodithioate triesters.

Another object is the provision of such a process by means of which an olefinic compound is reacted with a phosphorodithioic acid.

These and other objects are accomplished by the invention which is described hereinafter in detail.

It has been discovered that certain phosphorus- and sulfur-containing triesters can be prepared by the process of reacting (A) A phosphorothioic acid having the structure

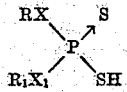

where X and $X_1$ are selected from the class consisting of oxygen and sulfur and where R and $R_1$ are the same or different organic radicals each attached to X and $X_1$ through a hydrogen linkage, with (B) An olefinic compound in the presence of a free-radical type catalyst at a temperature within the range of 0 to 150° C.

The expression "hydrocarbon linkage" in the description of (A) above refers to a carbon atom which, except for its attachment to the oxygen or sulfur atom of the formula, is otherwise attached only to hydrogen and/or carbon. Thus all hydrocarbon radicals as well as many other organic radicals are included. Illustrative examples of hydrocarbon radicals are the various alkyl, cycloalkyl, aralkyl, aryl, alkaryl, etc. radicals. These include specifically among others, such groups as methyl, ethyl, isopropyl, butyl, hexyl, octyl, decyl, hexadecyl, octadecyl, cyclopentyl, cyclohexyl, methyl-cyclohexyl, beta-phenethyl, alpha-phenethyl, benzyl, p-methylbenzyl, phenyl, p-tolyl, o-xylyl, cumyl, alpha-methylnaphthyl, etc.

Other organic radicals that are suitable are the substituted derivatives of the above hydrocarbon radicals, viz., beta-chloroethyl, omega-chlorobutyl, beta-hydroxyethyl, chlorocyclohexyl, p-nitrobenzyl, p-anisyl, o-anisyl, m-phenethyl, 2-bromo-4-tolyl, etc.

It will be noted that in each of the above illustrative examples the carbon atom which is attached to the oxygen atom of the structural formula is attached also only to a carbon atom and/or hydrogen atoms. Such a linkage is termed, for the purpose of this description and the appended claims, as a hydrocarbon linkage.

The olefinic compound generally is an olefin, i.e., a hydrocarbon which contains at least one double bond. Olefinic compounds containing elements in addition to carbon and hydrogen, e.g., those having halogen, hydroxyl, keto, mercapto, etc. substituents, may in some cases be desirable although it is preferred to employ olefins in the process of the invention. Specific examples of useful olefinic compounds include propylene, isobutylene, pentene-2, decene-1, octene-1, octene-2, styrene, divinylbenzene, vinylcyclohexane, allyl chloride, crotyl alcohol, etc.

The novelty of the process is readily demonstrated by the use of an unsymmetrical olefinic compound inasmuch as the identity of the product from such a process allows a ready characterization of the reaction as a normal or abnormal addition. Likewise the utility of the process is quite apparent in the preparation of certain phosphorodithioate triesters which are not easily available from other known methods of synthesis of this type of compound. Thus the 1-alkyl esters, for example, are not easily prepared by other methods whereas they may be obtained conveniently by the process of this invention.

The free-radical type catalysts include of course a wide variety of compounds, but it is particularly convenient and preferable to use peroxides as this catalyst. The convenience is evident from the fact that ordinary samples of olefins which have been exposed to oxygen appear to contain enough peroxides to be effective as catalysts for this reaction. Ordinarily then it is unnecessary to become concerned about the presence of a free-radical type catalyst since such a catalyst will be provided by the oxidized olefinic compound. It is necessary in such cases, however, to exercise precautions as to the presence of any reducing agent which might be present in the reaction mixture and which would tend to destroy the peroxides.

When it is desired to assure the presence of a minimum quantity of a free-radical type catalyst or when the olefin does not contain peroxides a small amount of a peroxide may be included in the reaction mixture. In such cases the peroxide may be any of the ordinarily available products, e.g., cumene hydroperoxide, ascaridole, benzoyl peroxide, lauroyl peroxide, etc. A trace of such a catalyst is sufficient in most instances, although more may be used if desired.

The reducing agent alluded to above may be introduced into the reaction mixture as an impurity in the phosphorodithioic acid. Such acids are prepared by the reaction of phosphorus pentasulfide and an alcohol or phenol, and generally the product from such a reaction is of 80–90 percent purity. Included in the 10–20 percent of impurity is a sufficient amount of at least one compound which will decompose the catalytic amount of peroxide required for the desired process of the invention. For this reason it is necessary to purify the ordinarily available phosphorodithioic acids before use in the process.

The lower members (diethyl, diisopropyl, etc.) of the class of phosphorodithioic acids are susceptible to purification by vacuum distillation without serious decomposition. This method of purification, however, does not appear to be satisfactory, as indicated by the observations noted in Example 1. It appears that vacuum distillation is not an effective method of purification of a phosphorodithioic acid which is to be used in the hereindescribed process.

By "vacuum distillation" it is meant to denote just that and not a careful fractionation. The latter method, if carried out in a precise manner, should yield a suitably pure acid for the purposes of this invention.

One method by which these undesirable impurities may be removed from a phosphorodithioic acid involves conversion of the acid to its metal salt, extraction of the salt with a non-polar solvent and regeneration of the acid from its metal salt by treatment with a mineral acid. The non-polar solvent may be carbon tetrachloride, chloroform, benzene, petroleum ether, ethyl ether, etc. If a particularly pure material is desired the acid may then be distilled.

The identity of the undesirable impurity has not been established with certainty. It may be that traces of phosphorus sesquisulfide which are known to be present in commercially available phosphorus pentasulfide, are carried through the preparation of a phosphorodithioic acid and appear therein as an impurity. Such a material is known to be capable of reducing peroxides, and of blocking the desired reaction of this invention.

Regardless of the method by which the phosphorodithioic acid is purified it is necessary that the purified acid be free of any substantial amounts of a reducing agent, of which phosphorus sesquisulfide is an illustration.

The reaction of the process involving a phosphorodithioic acid, an olefinic compound, and a catalytic amount of a free-radical type compound, proceeds according to a non-Markownikoff addition of the acid to the olefinic double bond. That is, the acidic hydrogen of the acid becomes attached to that olefinic carbon atom which is more positive while the acid residue becomes attached to the more negative olefinic carbon atom. As indicated earlier the more negative olefinic carbon atom can usually be identified as the one which bears the greater number of hydrogen atoms; although in instances where the two olefinic carbon atoms each have the same number of hydrogen atoms it is necessary to invoke the theory of hyperconjugation (or no-bond resonance) to enable a prediction of the nature of the addition.

The processing conditions require merely mixing and in some cases heating the aforesaid mixture for a period of time ranging from about one to twenty or more hours. The crude product may be purified if desired by washing with alkaline solutions to remove any unchanged acid. In some instances it may be desirable to further purify the ester by fractional distillation.

*Example 1*

To 1422 grams (7.6 moles) of vacuum distilled diethylphosphorodithioic acid there was added dropwise 832 grams (8.0 moles) of styrene. The subsequent exothermic reaction was maintained at a temperature range of 30–50° C. until all of the styrene had been added and then the temperature was held at 60–100° C. for an additional two hours. The mixture was allowed to cool; whereupon it was washed with 1000 ml. of 10% aqueous sodium hydroxide and then extracted with diisopropyl ether. The ether solution was washed with water and then dried with magnesium sulfate. Concentration of this solution yielded 2002 grams (91% yield) of a neutral product.

This product was identified as the alpha-phenethyl ester of the diethylphosphorodithioic acid by conversion of the alpha-phenethyl group to the corresponding sulfide by reaction with sodium methoxide. This sulfide was, in turn, characterized by oxidation with hydrogen peroxide to the corresponding sulfone; a melting point of a mixture of this sulfone with an authentic sample of methyl alpha-phenethyl sulfone showed no depression.

These observations indicate that the product resulted from a Markownikoff addition of styrene to the phosphorodithioic acid.

*Example 2*

A sample of 73 grams (0.39 mole) of distilled diethylphosphorodithioic acid from which impurities had been removed by washing the sodium salt of the acid with ether, was treated with 55 grams (0.49 mole) of ferrous sulfate-washed (to remove peroxides) octene-1. This mixture was heated at 70–75° C. for twelve hours and then allowed to cool. The mixture was washed with 200 ml. of 10% aqueous sodium hydroxide and then extracted with diisopropyl ether. The ether solution was washed with water, dried over magnesium sulfate, and concentrated by heating to a final temperature of 120° C./1 mm. The residue weighed 101 grams (87% yield) and was shown to be the product of a Markownikoff addition; i.e., 2-octyl diethylphosphorodithioate, by conversion to the corresponding methyl 2-octyl sulfide and oxidation thereof as in Example 1 above.

*Example 3*

To 83 grams (0.45 mole) of diethylphosphorodithioic acid, freed of impurities as in Example 2, there was added dropwise 62.5 grams (0.6 mole) of styrene. The temperature of the subsequent exothermic reaction was controlled by means of an ice bath until the addition of styrene was complete. Thereafter, the temperature was maintained at 70–72° C. for four and one-half hours. The product was then washed with 200 ml. of 10% aqueous sodium hydroxide, extracted with diisopropyl ether, and dried over magnesium sulfate. This ether solution was concentrated by heating to a final temperature of 120° C./0.5 mm. There was obtained 109 grams (84% yield) of a neutral product. This neutral product was shown to have been derived from a non-Markownikoff addition of the present invention by the same procedure as used in the previous example; i.e., the product was treated with sodium methoxide to give a methyl phenethyl sulfide from which the corresponding sulfone was obtained by hydrogen peroxide oxidation. This sulfone was, in turn, characterized by the method of mixed melting points as methyl beta-phenethyl sulfone.

*Example 4*

To 186 grams (1.0 mole) of diethylphosphorodithioic acid, free of impurities (as in Example 2), there was added 123 grams (1.1 mole) of octene-1. This mixture was heated at 100–110° C. for six and one-half hours. The resulting neutral mixture was washed with 200 ml. of 10% aqueous sodium hydroxide, extracted with diisopropyl ether, and dried over magnesium sulfate. The ether solution was concentrated by heating to a final temperature of 130° C./1.0 mm. The residue weighed 259 grams (87% yield) and was shown to contain the product of a non-Markownikoff addition; i.e., the n-octyl ester of diethylphosphorodithioic acid, by conversion with sodium methoxide to a methyl octyl sulfide and reaction of this sulfide with Chloramine-T to give a crystalline product which was characterized by the method of mixed melting points.

Example 5

A mixture of 67 grams (0.6 mole) of octene-1 and 3 ml. of cumene hydroperoxide was allowed to stand for three days at room temperature whereupon 93 grams (0.5 mole) of purified (as in Example 2) diethylphosphorodithioic acid was added. This mixture was heated until the acidity had decreased to a value of 14. The resulting mixture was washed with 200 ml. of 10% aqueous sodium hydroxide and dried over magnesium sulfate. This product was concentrated by heating to a final temperature of 140° C./1 mm. to yield 112 grams (75% yield) of the desired non-Markownikoff product, n-octyl diethylphosphorodithioate.

Example 6

To a mixture of 67 grams (0.6 mole) of octene-1 and a small amount of benzoyl peroxide at 50° C. there was added 121 grams (0.5 mole) of di-(n-butyl)phosphorodithioic acid, freed of impurities by ether extraction or its sodium salt. The resulting exothermic reaction caused the temperature to rise to 70° C. where it was maintained for twenty-one hours. The cooled product was washed with 10% aqueous sodium hydroxide, extracted with diisopropyl ether and the ether solution washed several times with water and then dried over magnesium sulfate. Upon concentration of this ether solution there was obtained 118 grams (67% yield) of the desired non-Markownikoff product, n-octyl di-(n-butyl)phosphorodithioate.

Example 7

To 121 grams (1.2 mole) of styrene there was added at room temperature 242 grams (1.0 mole) of purified (as in Example 6) di-(n-butyl)phosphorodithioic acid. This mixture was heated at 70–80° C. for six hours at which point the neutral product mixture was washed with 300 ml. of 10% aqueous sodium hydroxide and then extracted with naphtha. The naphtha extract was washed several times with water and then dried over magnesium sulfate. Concentration of the naphtha solution yielded the desired non-Markownikoff product, beta-phenethyl di-(n-butyl)phosphorodithioate.

Example 8

A sample of diisopropylphosphorodithioic acid was freed of undesirable impurities by extracting its sodium salt with naphtha and 214 grams (1.0 mole) of the resulting pure acid was added slowly to 121 grams (1.2 mole) of styrene. When the ensuing exothermic reaction had subsided the mixture was heated for five hours at 80° C. The product mixture was washed with 10% aqueous sodium hydroxide, then several times with water, and finally extracted with diisopropyl ether and dried over magnesium sulfate. Concentration of this ether solution by heating to a final temperature of 120° C./0.3 mm. yielded 272 grams of the desired non-Markownikoff product, beta-phenethyl diisopropylphosphorodithioate.

Other modes of applying the principle of the invention may be employed, change being made as regards the details described, provided the features stated in any of the following claims, or the equivalent of such be employed.

I therefore particularly point out and distinctly claim as my invention:

1. The process of preparing phosphorodithioate triesters which comprises reacting (A) a phosphorodithioic acid having the structure

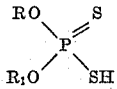

where R and $R_1$ are saturated hydrocarbon radicals, said acid having been purified by extraction of its metal salt with a non-polar solvent to remove reducing agents, with (B) an olefin in the presence of a free-radical type catalyst, at a temperature within the range of 0–150° C.

2. The process of claim 1 characterized further in that the free-radical type catalyst is a peroxide.

3. The process of claim 1 characterized further in that the free-radical type catalyst is a peroxide derived from the olefin of (B).

4. The process of claim 1 characterized further in that the free-radical type catalyst is benzoyl peroxide.

5. The process of claim 1 characterized further in that the saturated hydrocarbon radicals, R and $R_1$, are alkyl radicals.

6. The process of claim 1 characterized further in that the saturated hydrocarbon radicals, R and $R_1$, are lower alkyl radicals.

7. The process of claim 1 characterized further in that the olefin of (B) is styrene.

8. The process of claim 1 characterized further in that the saturated hydrocarbon radicals, R and $R_1$, are lower alkyl radicals, and the olefin of (B) is styrene.

9. The process of claim 1 characterized further in that the non-polar solvent of (A) is ether.

References Cited in the file of this patent

UNITED STATES PATENTS

| | | |
|---|---|---|
| 2,492,994 | Harmon et al. | Jan. 3, 1950 |
| 2,528,732 | Augustine | Nov. 7, 1950 |
| 2,565,354 | Cohen | Aug. 21, 1951 |
| 2,565,920 | Hook et al. | Aug. 28, 1951 |
| 2,578,652 | Cassaday | Dec. 18, 1951 |
| 2,632,020 | Hoegberg | Mar. 17, 1953 |
| 2,802,856 | Norman et al. | Aug. 13, 1957 |

OTHER REFERENCES

Bacon et al.: J. Am. Chem. Soc., 76, 670–676 (1954).
Cheronis: "Organic Chemistry," 6th printing (August 1947), Thomas Y. Crowell Co., New York, pp. 94, 95.